United States Patent [19]

Coulson et al.

[11] Patent Number: 4,848,703
[45] Date of Patent: Jul. 18, 1989

[54] METHOD OF TRANSPORTING OBJECTS BY HELICOPTER AND GRAPPLE ADAPTED THEREFOR

[75] Inventors: Wayne C. S. Coulson, Port Alberni; Philip S. Jarman, Courtenay; Gary E. Collinge, Parksville, all of Canada

[73] Assignee: Coulson Forest Products Ltd., Port Alberni, Canada

[21] Appl. No.: 137,035

[22] Filed: Dec. 23, 1987

[51] Int. Cl.⁴ .......................... B66C 1/28; B64D 1/08
[52] U.S. Cl. ................................. 244/137.1; 294/88; 294/106
[58] Field of Search ............... 294/88, 106, 66.1, 107, 294/111, 112; 244/137.1, 137.4

[56] References Cited

U.S. PATENT DOCUMENTS

| | | | |
|---|---|---|---|
| 435,839 | 9/1890 | Hunter | 294/112 X |
| 1,529,509 | 3/1925 | Ryan | 294/106 |
| 1,781,875 | 11/1930 | Hopkins | 294/106 |
| 2,757,037 | 7/1956 | Troyer . | |
| 2,862,756 | 12/1958 | Larson | 294/106 X |
| 3,082,031 | 3/1963 | Lindberg | 294/111 |
| 3,371,952 | 3/1968 | Hunger . | |
| 3,513,998 | 5/1979 | Stone . | |
| 3,746,385 | 7/1973 | Mitchell . | |
| 3,877,743 | 4/1975 | Johnson . | |
| 4,023,848 | 5/1977 | Bennett | 294/106 X |
| 4,131,294 | 12/1978 | Johson et al. . | |
| 4,152,019 | 5/1979 | Jarman et al. . | |
| 4,260,323 | 4/1981 | Muntjanoff . | |
| 4,358,147 | 11/1982 | Hungerford . | |

FOREIGN PATENT DOCUMENTS

| | | | |
|---|---|---|---|
| 627896 | 9/1961 | Canada | 294/88 |
| 171992 | 7/1960 | Sweden | 294/106 |
| 361970 | 1/1973 | U.S.S.R. | 294/88 |
| 391044 | 12/1973 | U.S.S.R. | 294/88 |

Primary Examiner—Robert B. Reeves
Assistant Examiner—Gary C. Hoge
Attorney, Agent, or Firm—Bull, Housser & Tupper

[57] ABSTRACT

A method of transporting an elongated object with a grapple includes placing the object in a generally horizontal position on a surface. The grapple is opened and placed about the object. The grapple is then closed about the object with a force sufficient to hold the arms of the grapple against the object, but insufficient to squeeze the object tightly between the arms. The grapple is raised with the object, and the object is allowed to swing between the arms of the grapple to a generally vertical position. The grapple may include two arms having pivotally interconnected inner ends. The arms have outer portions at the outer ends with edges directed towards the inner ends. The grapple has a closed position wherein the edges of the outer portions are perpendicular to an axis symmetry extending between the arms of the grapple.

5 Claims, 6 Drawing Sheets

METHOD OF TRANSPORTING OBJECTS BY HELICOPTER AND GRAPPLE ADAPTED THEREFOR

BACKGROUND OF THE INVENTION

The invention relates to a method of transporting elongated objects, such as logs, by helicopter and a grapple adapted therefor.

Helicopters are commonly used to transport valuable timber from remote locations or from difficult terraine such as encountered in the Pacific Northwest of the United States of America or in the coastal region of British Columbia, Canada. Several factors have limited the use of helicopters. Firstly, it is widely recognized that the operation of helicopters is extremely expensive, and thus they must be utilized with great efficiency in order to provide a profitable operation. This means loading and unloading logs expeditiously so that the turn around time is decreased to the minimum possible, and the maximum number of logs are transported in a given period of time. Furthermore, it is highly advantageous to load the logs without the need of ground personnel. This removes the need for stationing personnel at the loading location to load the helicopter, and also improves the safety factor by removing persons who might be injured during the loading operation.

Systems have been developed in the past for transporting logs and other materials by use of a grapple suspended from a helicopter. One such system is shown in U.S. Pat. No. 4,152,019 to Jarman. However, such earlier systems have frequently not gained widespread acceptance due to real or perceived disadvantages. For example, in some cases a relatively complex installation is required within the helicopter or an auxiliary winch is required within the helicopter or an auxiliary winch platform must be suspended from the helicopter. In some cases there have been difficulties meeting safety and operational requirements. The need therefore remained, prior to this invention, for a relatively simple system for loading and transporting logs or other such objects by means of a grapple suspended from a helicopter while having a self-loading feature and a stable configuration during flight.

SUMMARY OF THE INVENTION

According to the invention, a grapple has two arms with pivotally interconnected inner ends and outer ends. The arms have outer portions at the outer ends with edges directed towards the inner ends. The grapple has a closed position wherein the edges of the outer portions are perpendicular to an axis of symmetry extending between the arms of the grapple.

Another aspect of the invention provides a method of transporting an elongated object with a grapple. The method includes the steps of placing the object in a generally horizontal position on a surface and opening the grapple. The grapple is placed about the object, and then closed about the object with a force sufficient to hold the arms of the grapple against the object, but insufficient to squeeze the object tightly between the arms. The grapple and the object are raised, and the object is allowed to swing between the arms of the grapple to a generally vertical position. Preferably the object is held near one end thereof, to assure the swinging to the vertical position.

DESCRIPTION OF THE PREFERRED EMBODIMENTS

Figure 1:
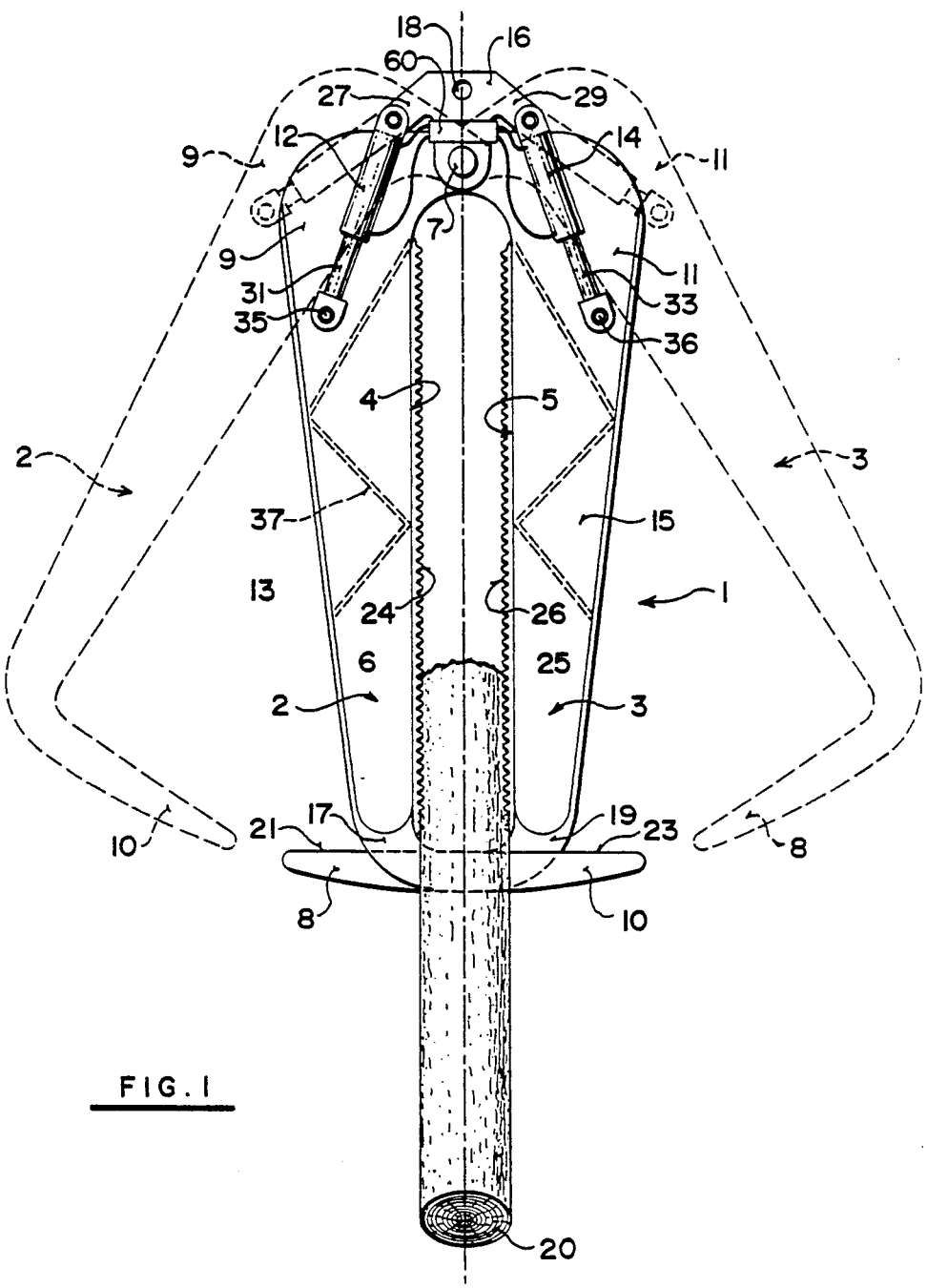
FIG. 1 is a side elevation of a grapple according to an embodiment of the invention.

Referring firstly to FIG. 1, this shows a grapple 1 according to an embodiment of the invention. The grapple has two arms 2 and 3, which are pivotally interconnected by means of a pivot pin 7 extending through inner ends 9 and 11 of the arms, and generally T-shaped mounting member 16.

The arms have elongated portions 13 and 15 which extend from inner ends 9 and 11 to outer ends 17 and 19 of the two arms respectively. The elongated portions have inside edges 4 and 5, which are parallel when the grapple is in the closed position shown in solid lines. A row of gripping projections 24 and 26 in the form of a plurality of sharp teeth, are provided along the inside edges 4 and 5. These gripping projections are at opposing positions, extending substantially the full length of the inside edge 4 and 5. These gripping projections are adapted to grasp a log 20 or other such object held within the grapple.

The arms are also provided with outer portions 8 and 10 respectively. These outer portions extend perpendicular to elongated portions 13 and 15. The outer portions have edges 21 and 23 respectively directed towards the inner ends 9 and 11 of the arms.

It may be observed in FIG. 1 that the outer portions 8 and 10 are pointed towards each other, which is particularly apparent in the open position of the grapple illustrated in broken lines. The outer portions are offset so that they overlap, as may be observed in the closed position where outer portion 8 is located behind outer portion 10 from the point of view of the drawing. It may be observed that edges 21 and 23 are perpendicular to inside edges 4 and 5 of the elongated portions of the arms, and also to an axis of symmetry 25 extending between the arms of the grapple.

Mounting member 16 has an aperture 18 which serves as means for connecting a cable to the grapple for suspending the grapple. Arms 27 and 29 serve as mounts for hydraulic cylinders 12 and 14. Rods 31 and 33 of the cylinders are pivotally connected to arms 2 and 3 at 35 and 36 respectively. It may be observed that the arms may be opened by retracting the rods 31 and 33 into the cylinders 12 and 14, and the arms are closed by extending the rods from the cylinders employing the internal piston of each cylinder.

The grapple may be made of many alternative materials, such as sheet metal. Lighter materials such as aluminum are preferred. The arms may be fabricated as four-sided members, having strengthening ribs 17 located internally therein as shown in broken lines.

The grapple 1 is shown operationally in FIGS. 2-5. Here the grapple is suspended by means of a cable 39 suspended from the bottom of a helicopter 40 below its centre of gravity. Hydraulic lines 41 extend along the cable to the grapple to supply hydraulic fluid to a manifold 60 which distributes hydraulic fluid to cylinders 12 and 14.

Figure 2:
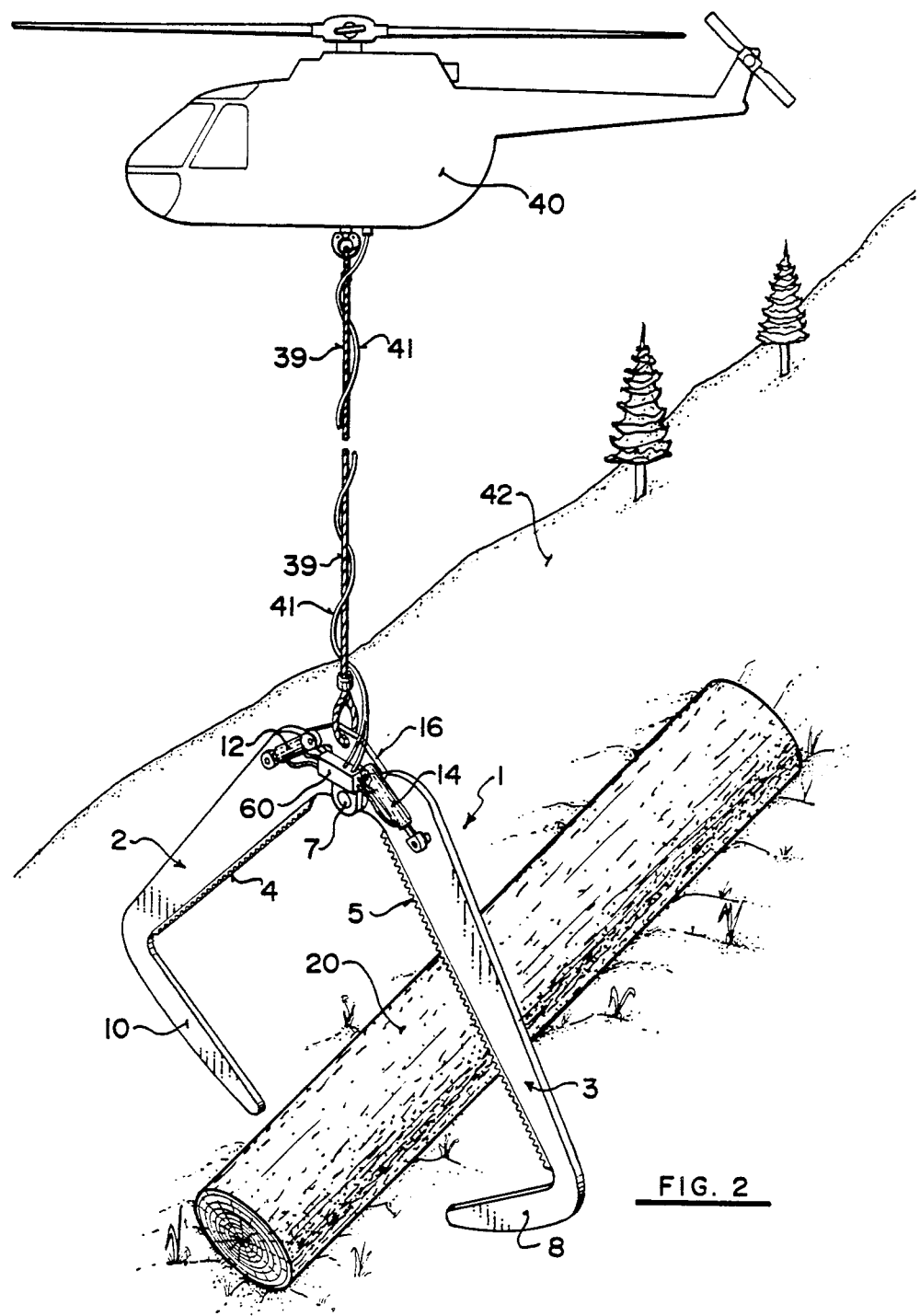
FIG. 2 is a simplified side elevation of a grapple according to FIG. 1 suspended by a cable from a helicopter, being placed about a log on the side of a hill.

Log 20 is shown in FIG. 2 resting on the side of a hill 42. The grapple is first opened from the closed position shown in solid lines in FIG. 1 to the open position shown in broken lines, utilizing hydraulic cylinders 12 and 14. The grapple is then placed about the log as shown in FIG. 2, so the arms extend on each side of the log and the tips of outer portions 8 and 10 are directed beneath the log. Hydraulic cylinders 12 and 14 are then utilized to close the grapple about the log, until the grapple is in the closed position as shown in FIG. 3 and in solid lines in FIG. 1.

It may be recognized that the distance between the arms is set by the diameter of the log, and thus the arms may be opened somewhat wider or closed somewhat more than illustrated, and thus inside edges 4 and 5 are only approximately parallel in the closed position.

When the arms are closed, the inside edges 4 and 5 contact the log 20, and outer portions 8 and 10 are cradled under the log in an overlapping manner, as illustrated in FIG. 1. The hydraulic pressure supplied to the cylinders is sufficient to hold the arms against the log, but it is not sufficient to squeeze the log tightly between the arms. The log, however, is held securely with the aid of the gripping projections 24 and 26.

Figure 3:
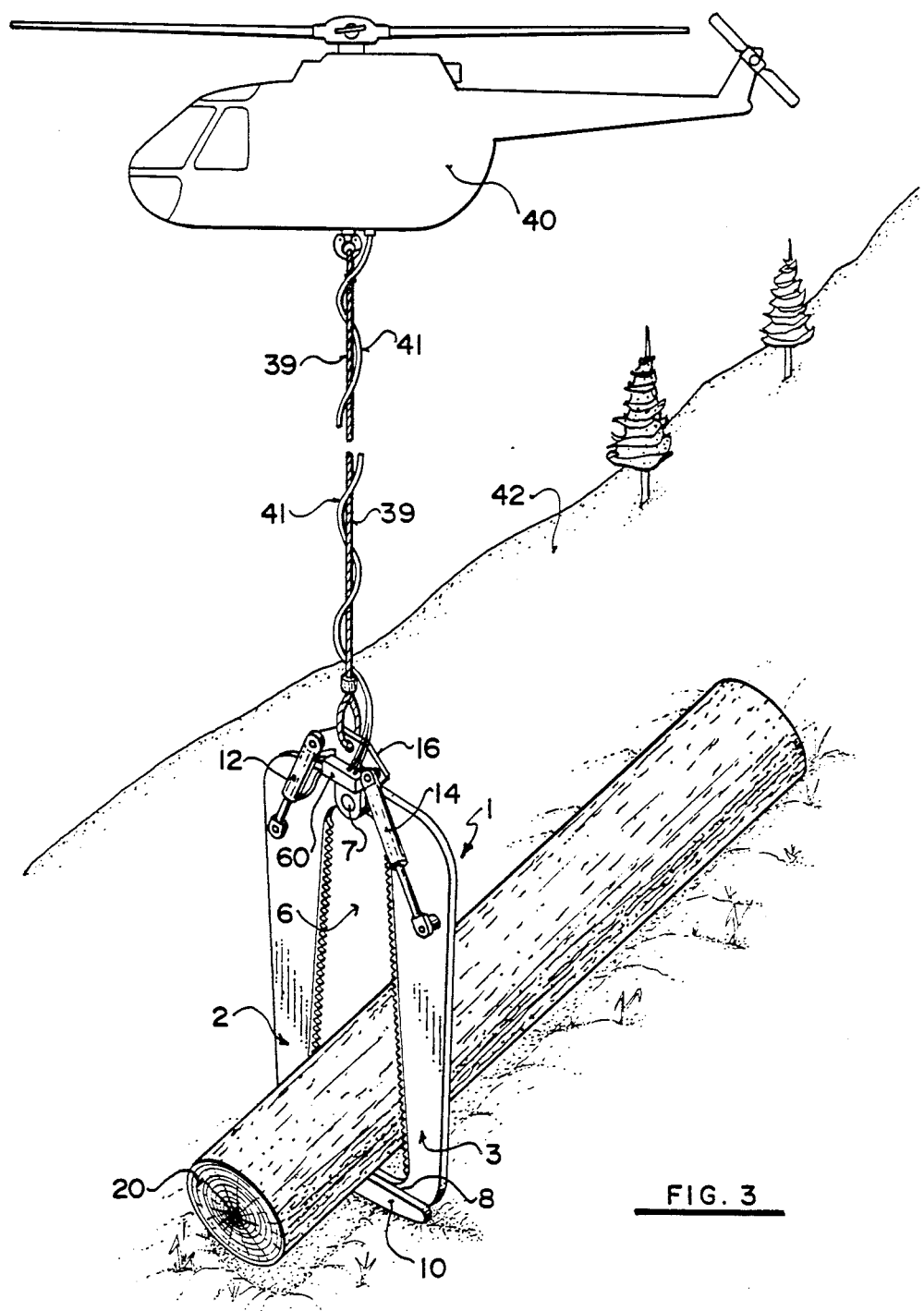
FIG. 3 is a view similar to FIG. 2, showing the grapple closed about the log.
Figure 4:
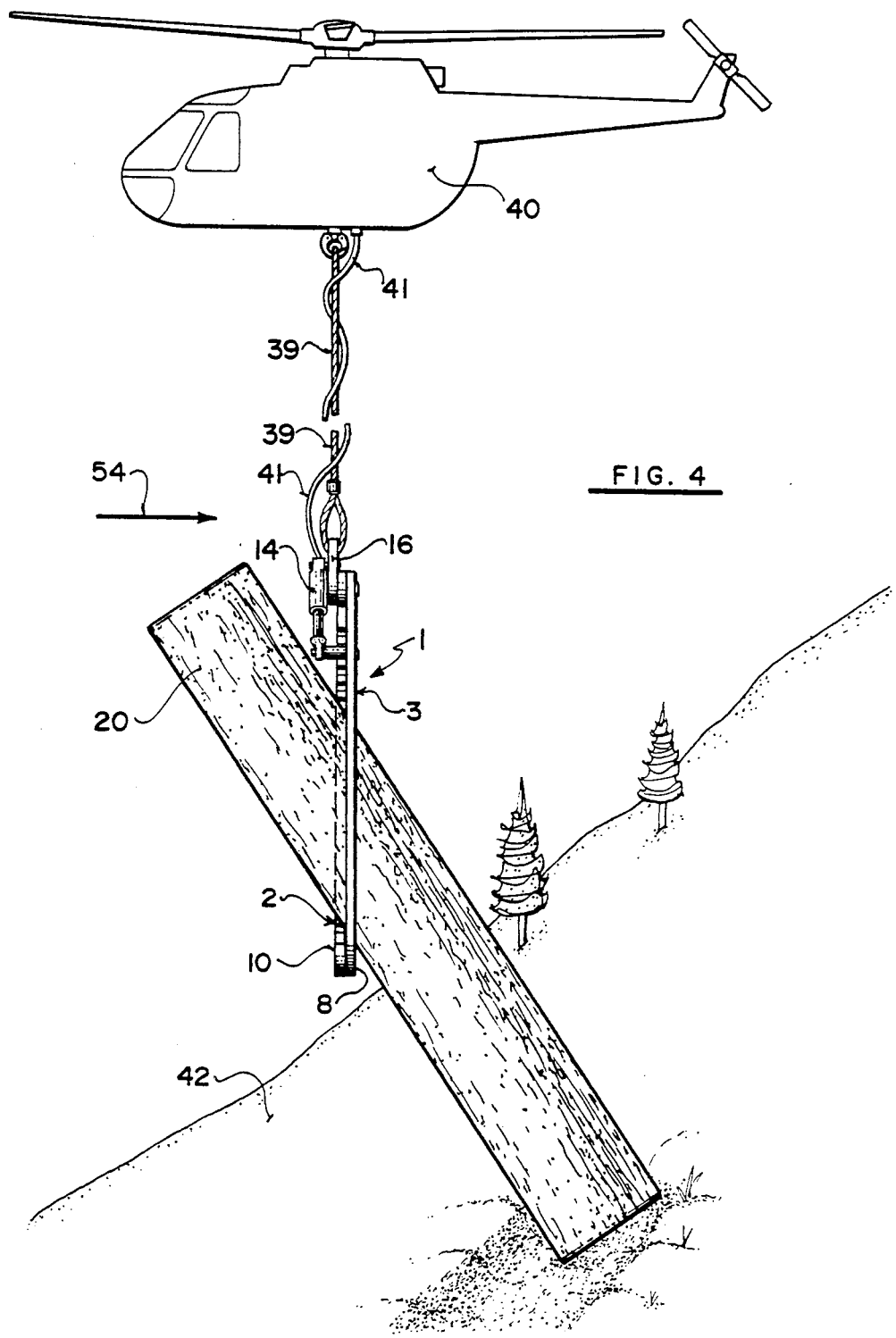
FIG. 4 is a view similar to FIG. 2, showing the log raised to a vertical position, resting on the ground.
Figure 5:
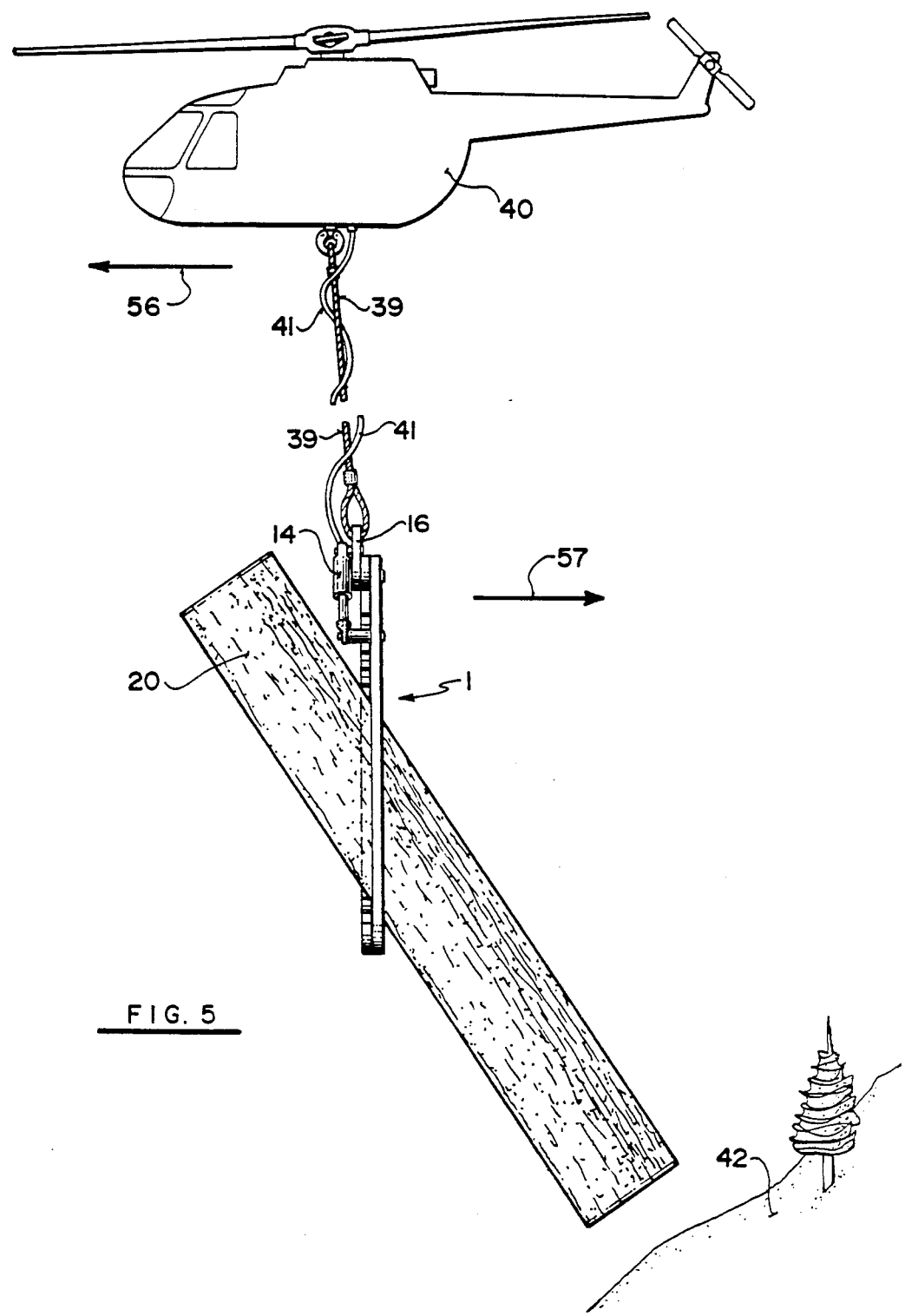
FIG. 5 is a view similar to FIG. 2, showing the log raised from the ground by the helicopter and grapple, and being transported.
Figure 6:
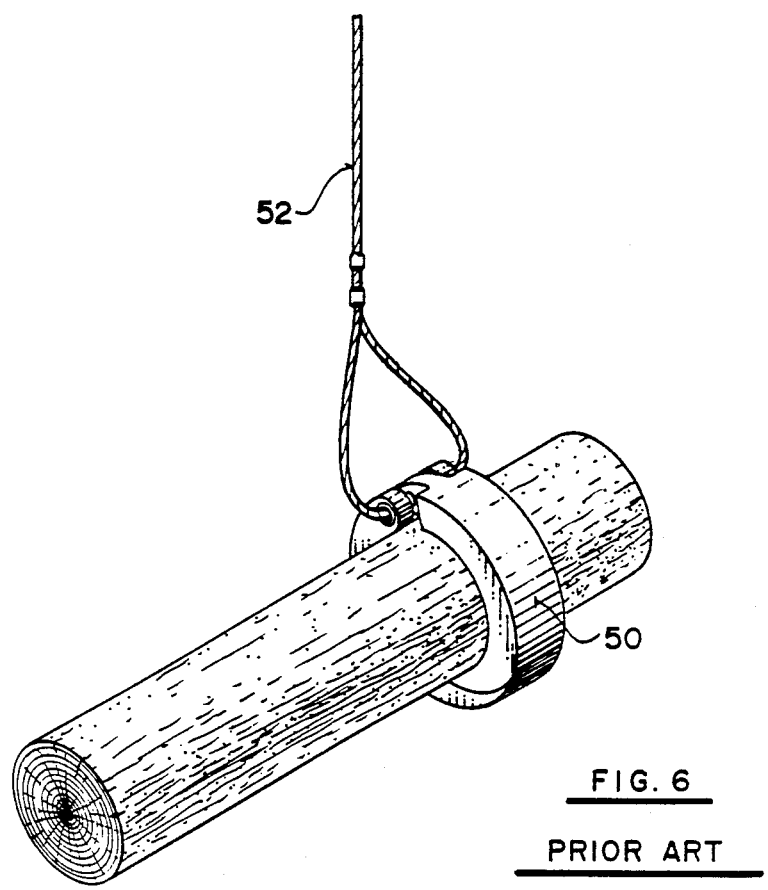
FIG. 6 is a fragmentary view of a conventional grapple engaging a log and suspended by a cable according to the prior art.

It may be observed in FIG. 3 that the log is held by the grapple near one end thereof. Thus, when the helicopter lifts as shown in FIG. 4, the log tends to rotate within the grapple to a vertical position. Relative rotation is permitted between the log and the grapple because the grapple does not tightly squeeze the log. This is to be compared with a conventional grapple which tightly engages the log, such as grapple 50 of FIG. 6. It may be observed that the grapple remains substantially at right angles to the log even when suspended from a cable 52. This places considerable bending stresses on the arms of the grapple, and prevents the log from achieving a more vertical position. By comparison, as seen in FIG. 4 and 5, grapple 1 and log 20 are capable of achieving a much more vertical position due to the fact that the grapple is not held at right angles to the log. In this way, bending stresses on the grapple are reduced and the log is held more nearly vertical which is a more stable position for flight.

During the raising of the log from the substantially horizontal position of FIG. 3 to the vertical position of FIG. 4, the log moves upwardly within the elongated opening 6 between the arms of the grapple as shown in FIG. 1. The amount the log raises depends upon its diameter. However, at all times the log rests upon outer ends 8 and 10.

For normal sized logs which are normally transported using helicopters, flight is initiated by propelling the helicopter in the forward direction in the usual way.

When relatively heavy logs are to be transported flight is initiated by leaning the log backwards relative to the proposed direction of travel as illustrated by arrow 54 in FIG. 4. This is the uphill direction when the log is located on a hillside. The helicopter then commences forward flight as indicated by arrow 56 and FIG. 5. The tilting of the log forwards from the backward angle of FIG. 4 gives the helicopter some distance to pick up velocity and thereby lift to lift the log from the ground as it tilts forward so the log can be transported through the air as shown in FIG. 5. It may be observed that the log tends to move backwards in the direction of arrow 57 due to air resistance during forward flight. This backwards movement of the log and grapple rearwardly of the centre of gravity of the helicopter tends to stabilize flight.

The grapple and method disclosed above offer significant advantages over prior art. For example, because the grapple is held more nearly vertical as may be observed by comparing FIGS. 5 and 6, the stresses on the grapple are less, and it may be made lighter since it is not as subject to bending forces. A lighter weight grapple may be critical in dictating whether or not a heavy log can be carried by the helicopter or not.

When the logs are being transported, sufficient hydraulic pressure is required only to hold the arms 2 and 3 together. In other words, the log is not secured by pressure exerted by the arms against the log. The weight of the log is carried by outer portions 8 and 10 of the arms, and in particular their edges 21 and 23. These edges are substantially horizontal in flight and thus, the log resting against these edges does not tend to open the grapple. This is to be compared with grapples having a curved lower portion as opposed to having these straight edges. A log resting on a curved surface tends to open the grapple and thereby requires considerable pressure to retain the log in place. Gripping projections 24 and 26 also help assure that the log is gripped without an undue requirement for hydraulic pressure.

Holding the log vertical during transport, as illustrated in FIG. 5 is particularly advantageous because it allows the log to be flown between obstructions such as trees.

It is also possible to carry more than one log at the same time with the grapple. For example, if two logs of substantially different diameter are carried, then the larger log only will be gripped by both sets of gripping projections 24 and 26. The smaller log, if on top of the larger one, rolls over the top of the larger log, and contacts the gripping projections on one side of the grapple. As the logs are tilted to the vertical position, the top of the smaller log moves up along the opening 6 in the grapple until it engages the gripping projections 23 and 24 on both sides of the grapple. If the smaller log is on the bottom, the smaller log is pinched between the larger log and one arm of the grapple. Only occasionally would a smaller log be positioned underneath a larger one. A smaller log can also be pinched parallel to a large log, between the large log and one side of the grapple.

What is claimed is:

1. In combination:
a helicopter, a cable extending down from the helicopter, a grapple suspended below the helicopter by the cable, and a log secured in the grapple for transport by the helicopter, the grapple having two arms, means for pivotally connecting the arms near the tops thereof and means for moving the arms towards each other, the arms having upper portions with inner edges which are parallel and spaced-apart a distance generally equal to the diameter of the log and overlapping lower portions connected to the upper portions extending towards each other below the log and having straight, upper edges which are generally perpendicular to the inner edges of the upper portions, the log being supported on the upper edges of the lower portions and being held between the inner edges of the upper portions with the log and the grapple being generally vertical and aligned below the helicopter.

2. A combination as claimed in claim 1, wherein the grapple includes a mounting member with the arms mounted pivotally thereon, the means for moving the arms towards each other comprising actuator means operatively connected between the arms and the mounting member.

3. A combination as claimed in claim 2, wherein the actuator means comprises a fluid cylinder connected between the mounting member and each of the arms.

4. A combination as claimed in claim 1, wherein the inner edges have opposing gripping teeth extending there along.

5. A method of transporting a log with a helicopter and a grapple, comprising the steps of:
 suspending the grapple from the helicopter with a cable;
 opening the grapple;
 placing the grapple about the log near one end of the log;
 closing the grapple with sufficient force to hold the log with the grapple, but insufficient force to squeeze the log with the grapple; and
 raising the grapple and the log so the log swings with the grapple until the log and the grapple are substantially vertical below the helicopter during transport of the log.

* * * * *